J. N. FARRAR.
Car Wheel.

No. 99,547.                          Patented Feb. 8, 1870.

Witnesses:

Inventor:

UNITED STATES PATENT OFFICE.

JOHN N. FARRAR, OF PEPPERELL, MASSACHUSETTS, ASSIGNOR TO HIMSELF AND GEO. E. BROWN, OF SOUTH RIVER, NEW JERSEY.

IMPROVED RAILWAY-CAR WHEEL.

Specification forming part of Letters Patent No. 99,547, dated February 8, 1870.

*To all whom it may concern:*

Be it known that I, JOHN N. FARRAR, of Pepperell, in the county of Middlesex and State of Massachusetts, have invented a new and useful Improvement in Car-Wheels; and I do hereby declare that the following is a full, clear, and exact description thereof, which will enable others skilled in the art to make and use the same, reference being had to the accompanying drawings, forming part of this specification, in which—

Figure 1:
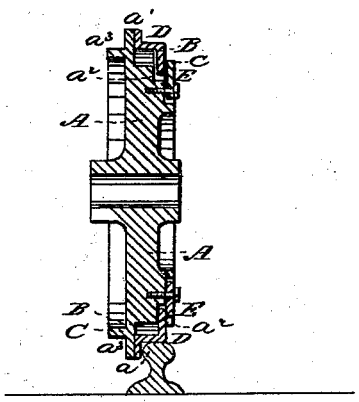
Figure 2:
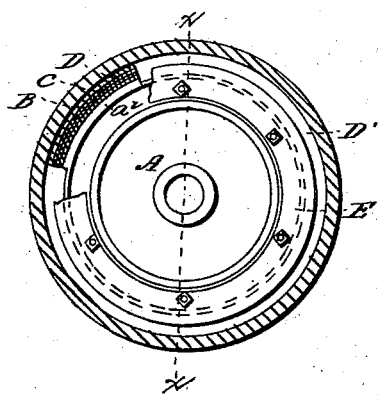
Figure 3:
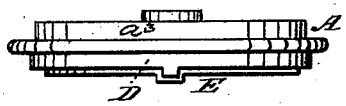

Figure 1 is a detail cross-section of my improved car-wheel, taken through the line $x\,x$, Fig. 2. Fig. 2 is a side view of the same, parts being broken away to show the construction. Fig. 3 is a top view showing a modification of the same.

Similar letters of reference indicate corresponding parts.

My invention has for its object to furnish an improved wheel for steam and horse cars, engines, &c., which shall be strong and durable, and at the same time so constructed as to avoid the constant jarring and noise now attending railway traveling, and reducing the liability of accidents from breaking of wheels, &c., and also in a great degree preventing the battering of the ends of the rails by constant hammering of the car-wheels; and it consists in the construction and combination of the various parts of the wheel, as hereinafter more fully described.

A represents the solid body of the wheel, made in the ordinary hollow style, which is cast with a flange, $a'$, upon the inner side of its tread $a^2$, which is the side facing the middle of the road, and with a circular or ring flange, $a^3$, upon the inside face of the wheel or flange $a'$, to receive the brake, so that the said brake need not be applied to the inner face or tread, $a^2$, of the wheel. Upon the tread or face $a^2$ is placed a band or tire, B, of rubber or other soft and flexible material, whole or in sections, which is kept in place upon the tread $a^2$ by an open metallic band or ring, C, as shown in Figs. 1 and 2. The soft or rubber tire B may be still further guarded against slippping from its place by corrugating or grooving the face of the tread $a^2$.

D is the metallic tire, which is placed upon the soft or rubber tire B, with its outer edge resting against the inner or tread side of the flange $a'$. The tire D is formed with an outwardly-projecting flange upon its outer edge, extending up along the inside of the flange $a'$, so as to bear against the rail and receive the wear, thus relieving and protecting the cast-iron flange $a'$ of the wheel A. The tire D is formed with an inwardly-projecting flange upon its outer edge, which enters a recess in the body A of the wheel, as shown in Figs. 1 and 2, so that the tire D may move inward and outward as the soft tire B is compressed by the pressure of the wheel upon the rail over which it rolls. The tire D is kept in place by the ring collar-plate E, which fits into a recess formed for its reception upon the land side of the body A of the wheel, to which body A it is securely bolted. By this construction the tire D will yield when the wheel strikes an obstruction, so that the ends of the rails will not be battered, as they are when struck by a solid wheel. The soft or flexible tire B also prevents the constant jar and noise attending the passage of the car over the rails of the track, which is unavoidable with wheels constructed in the ordinary manner.

In case the brake should be applied to the flange $a^3$ with such force as to stop the revolution of the wheel before the motion of the car has been stopped, the sliding of the wheel and the friction of the tire D upon the rail, tending to revolve the said tire upon the body A of the wheel, might injure the soft or rubber tire B. To prevent this, a rib or ribs may be formed upon the inside or outside of the flange of the tire D, entering a groove or grooves formed in the outer side of the wheel A, or in the inner side of the collar-plate E, as shown in red in Fig. 3, so as to prevent the revolution of the said tire D, the said groove or grooves being made larger than the said ribs to allow the said tire to work freely as the wheel revolves. The same thing may be accomplished by pins attached to the tire D, and passing through holes in the open band C and flexible tire B, and entering recesses in the tread $a^2$ of the body A of the wheel. The former construction I prefer, as it allows the soft tire to operate more freely.

Having thus described my invention, I claim as new and desire to secure by Letters Patent—

1. In combination with the tread-surface $a^2$, the tire D, formed with two right-angled flanges, for the purpose of protecting the central flange, $a'$, from abrasion and rapid wear, as set forth.

2. The improved method, herein described, of constructing wheels for cars, and similar wheels, by interposing an elastic material between the tread-surface and tire, and protecting the bearing-flange from wear by a flanged tire.

3. The combination of the ring collar-plate E with the flanged metallic tire D and wheel A, substantially as herein shown and described, and for the purpose set forth.

The above specification signed by me this 10th day of May, 1869.

JOHN N. FARRAR.

Witnesses:
FRANK BLOCKLEY,
JAMES T. GRAHAM.